United States Patent
Dodman et al.

(10) Patent No.: US 7,217,037 B2
(45) Date of Patent: May 15, 2007

(54) ECCENTRIC BRACKET ASSEMBLY

(75) Inventors: Chris Dodman, Basel (CH); James Gardner, New Fairfield, CT (US); Curt Davis, Sandy Hook, CT (US)

(73) Assignee: Cannondale Bicycle Corporation, Bethel, CT (US)

( * ) Notice: Subject to any disclaimer, the term of this patent is extended or adjusted under 35 U.S.C. 154(b) by 55 days.

(21) Appl. No.: 11/062,132

(22) Filed: Feb. 18, 2005

(65) Prior Publication Data

US 2006/0189426 A1    Aug. 24, 2006

(51) Int. Cl.
*F16C 19/08* (2006.01)
(52) U.S. Cl. ...................... 384/538; 384/255
(58) Field of Classification Search ............... 384/545, 384/538, 255, 544, 267
See application file for complete search history.

(56) References Cited

U.S. PATENT DOCUMENTS 4,808,147 A    2/1989  Graham

*Primary Examiner*—Lenard A. Footland
(74) *Attorney, Agent, or Firm*—St. Onge Steward Johnston & Reens LLC

(57) ABSTRACT

An adjustable eccentric bracket assembly for a bicycle provided with at least two wedge surfaces in a body member designed to co-act with at least one wedge member having a wedge surface, where upon axial displacement of the wedge member relative to the body member, the wedge member is laterally displaced so as to selectively engage with an inner surface of a shell in which the body member is received.

22 Claims, 7 Drawing Sheets

ECCENTRIC BRACKET ASSEMBLY

FIELD OF THE INVENTION

The invention relates to an eccentric bracket assembly for use in selectively adjusting the chain of a bicycle, and more particularly to a reduced weight bracket assembly that minimizes binding of the bracket assembly with the frame of the bicycle.

BACKGROUND OF THE INVENTION

The front and rear driving sprockets of bicycles are typically coupled by a chain, which must be provided with the correct tension to function properly. However, it is impractical to manufacture highly precise components for providing the correct tension. In addition, adjustability of the components is highly desirable for installation and maintenance of the chain. It is therefore, well known and conventional to provide for fore and/or aft adjustment of the rotational axis of the front pedal crank spindle, on which the front driving sprocket is mounted. Among the adjusting devices known for this purpose are so-called eccentric mounts, in which the rotary axis of the spindle is eccentric to a cylindrical casing that is rotatable among adjusted positions in a shell. The shell is arranged to hold the casing in the adjusted position.

One arrangement for fixing the eccentric in the adjusted position is to use a split shell and two binder blocks, which tighten the shell to clamp the spindle casing in the adjusted position. This design is similar to the way in which the heights of bicycle seat posts are adjustably changed within the seat tube. Another known arrangement is based on a setscrew concept. However, a major disadvantage of both these designs is that both the binder block and set screw designs involve components external to the shell that detract from the appearance of the assembly, as compared to a conventional bottom bracket assembly, and both require extra manufacturing operations, which increase labor costs, such as the costs of splitting the shell and welding or brazing on fittings.

Another concept is disclosed in U.S. Pat. No. 4,808,147 ("the '147 patent") in which an eccentrically mounted spindle that is rotatably adjustable in a sleeve was provided having no external elements. This concept solved a number of the problems mentioned in the prior art. However, the bracket taught in the '147 patent comprises a solid body portion having a single planar wedge surface that is designed to co-act with a wedge. Due to the single planar wedge surface, the overall weight of the bracket is increased. In addition, the relatively large surface area of the single planar wedge surface may contribute to sticking of the wedge to the single planar wedge surface when attempting to remove the wedge therefrom.

Therefore what is desired then is a design that reduces the overall weight of the bracket while maintaining structural rigidity and strength.

It is further desired to provide a bracket that reduces the possibility of the wedge getting jammed in an inserted position such that release is difficult to achieve.

It is still further desired to provide a bracket that may be universally mounted and utilized for both left-handed and right-handed drive trains.

SUMMARY OF THE INVENTION

These and other objects are achieved by the provision of an adjustable bottom bracket assembly for a bicycle on an eccentrically mounted spindle rotatably adjustable in a sleeve having no external elements. The assembly according to the present invention is easy to adjust, durable, reliable and has a reduced overall weight. A preferred use of the assembly is for the front bottom bracket of a tandem bicycle to enable adjustment of the chain that couples the front and rear driving sprockets. In this use the rear bottom bracket assembly provides a fixed axis of rotation for the rear pedal crank spindle, and the rear wheel dropouts enable adjustment of the main driving chain tension. An alternative use of the invention is in the rear bottom bracket assembly, in which case the front bottom bracket assembly provides a fixed axis of rotation for the front pedal crank spindle. The invention may further be utilized in single-rider bicycles and in both bottom brackets of for instance, tandem bicycles. It is further contemplated that the present invention may be utilized in recumbent bicycles.

According to the invention a bottom bracket assembly includes a tubular shell having a cylindrical internal surface. An eccentric body member has an external outer cylindrical surface that may be provided in close fit with the internal surface of the shell. A wedge or wedges may be provided to co-act with the body member to alternatively tighten or loosen the body member with respect to the shell. The body member and the wedge(s) are provided with complimentary wedge surfaces such that when the wedge(s) are laterally displaced relative to the body member, the wedge(s) are also displaced perpendicular to the body member to alternately tighten or loosen the body member to the shell.

In one embodiment, at least two wedge surfaces are provided on the body member, which are disposed obliquely to an axis of the body member and complementary to the wedge surface provided on the wedge(s). Provision of the at least two wedge surfaces provides a number of advantages. For instance, the overall weight of the bracket is reduced because less material is used to form the bracket than if a single elongated wedge surface were provided. The reduced surface area also ensures the any possibility of the wedge(s) getting jammed in the tubular shell is reduced as the surface area between the wedge(s) and the at least two wedge surfaces is reduced when compared to a single wedge surface.

In another embodiment, the body member may further be provided with a bore eccentric to the body member diameter and adapted to receive a journal for rotatably supporting a pedal crank spindle.

In still another embodiment, a single wedge member is provided having an external surface in close fit to the internal surface of the shell and a wedge surface complementary to the at least two wedge surfaces of the eccentric body, which is received in the shell adjacent the body member. A wedge driver may further couple the body member and single wedge to each other to move the single wedge axially relative to the at least two planar wedge surfaces, which in turn causes lateral displacement of the wedge relative to the body member.

In yet another embodiment, at least two wedge members may be provided having external surfaces in close fit to the internal surface of the shell and having wedge surfaces complementary to the at least two wedge surfaces of the body member. This embodiment may also include a wedge driver for coupling the at least two wedge members to each other to move the at least two wedges axially relative to the at least two planar wedge surfaces, which in turn causes lateral displacement of the at least two wedges relative to the body member.

The wedge driver for either embodiment may comprise for instance, but is not limited to a screw having a threaded portion in driving relation with the wedge member and a head portion in engaging relation with for instance the body member in one embodiment, or in another embodiment, the drive element may engage the multiple wedge members to each other such that each may be axially displaced relative to the at least two wedge surfaces. However, it is contemplated that the wedge driver may comprise any system for moving the wedge(s) relative to the body member for axial and therefore lateral displacement.

In one advantageous embodiment bracket assembly for a petal shaft of a bicycle frame is provided comprising, a body member having a longitudinal axis, to be positioned within the bicycle frame for receiving the petal shaft, the body member having, at least two body member wedge surfaces that are sloped with respect to the longitudinal axis of the body member, and a bore having an axis eccentric to the longitudinal axis of the body member. The bracket assembly further comprises at least one wedge member having a wedge surface co-planar with at least one of the at least two wedge surfaces of the body member, and a wedge driver for axially displacing the at least one wedge member relative to the body member. The bracket assembly is provided such that when the at least one wedge member is displaced axially, the at least one wedge member is laterally displaced relative to the body member such that the bracket assembly is engageable with an internal surface of the bicycle frame.

In another advantageous embodiment a bracket assembly is provided comprising, a body member to be positioned within an opening, said body member having, a bore having a longitudinal axis eccentric to a longitudinal axis of the body member, a first outer surface having a first diameter $d_1$, a second outer surface having a second diameter $d_2$, wherein $d_1$ is larger than $d_2$, and a body member wedge surface that is sloped with respect to the longitudinal axis of the body member. The bracket assembly further comprises, at least one wedge member having a wedge surface co-planar with the body member wedge surface, and a wedge driver for moving the at least one wedge member relative to the body member. The bracket assembly is provided such that when the at least one wedge member is displaced axially, the at least one wedge member is laterally displaced relative to the body member such that bracket assembly is engageable with an internal surface of the opening.

In still another advantageous embodiment a bracket assembly for mounting a shaft within a machine is provided comprising, a body member having a longitudinal axis, to be positioned within the machine for receiving the shaft, the body member having, at least two body member wedge surfaces that are sloped with respect to the longitudinal axis of the body member, and a bore having an axis eccentric to the longitudinal axis of the body member. The bracket assembly further comprises, at least one wedge member having a wedge surface co-planar with at least one of the at least two wedge surfaces of the body member, and a wedge driver for axially displacing the at least one wedge member relative to the body member. The bracket assembly is provided such that when the at least one wedge member is displaced axially, the at least one wedge member is laterally displaced relative to the body member such that the bracket assembly is engageable with an internal surface of the machine.

For a better understanding of the invention reference may be made to the following description of an exemplary embodiment, taken in conjunction with the accompanying drawing.

DETAILED DESCRIPTION OF THE DRAWINGS

Figure 1:
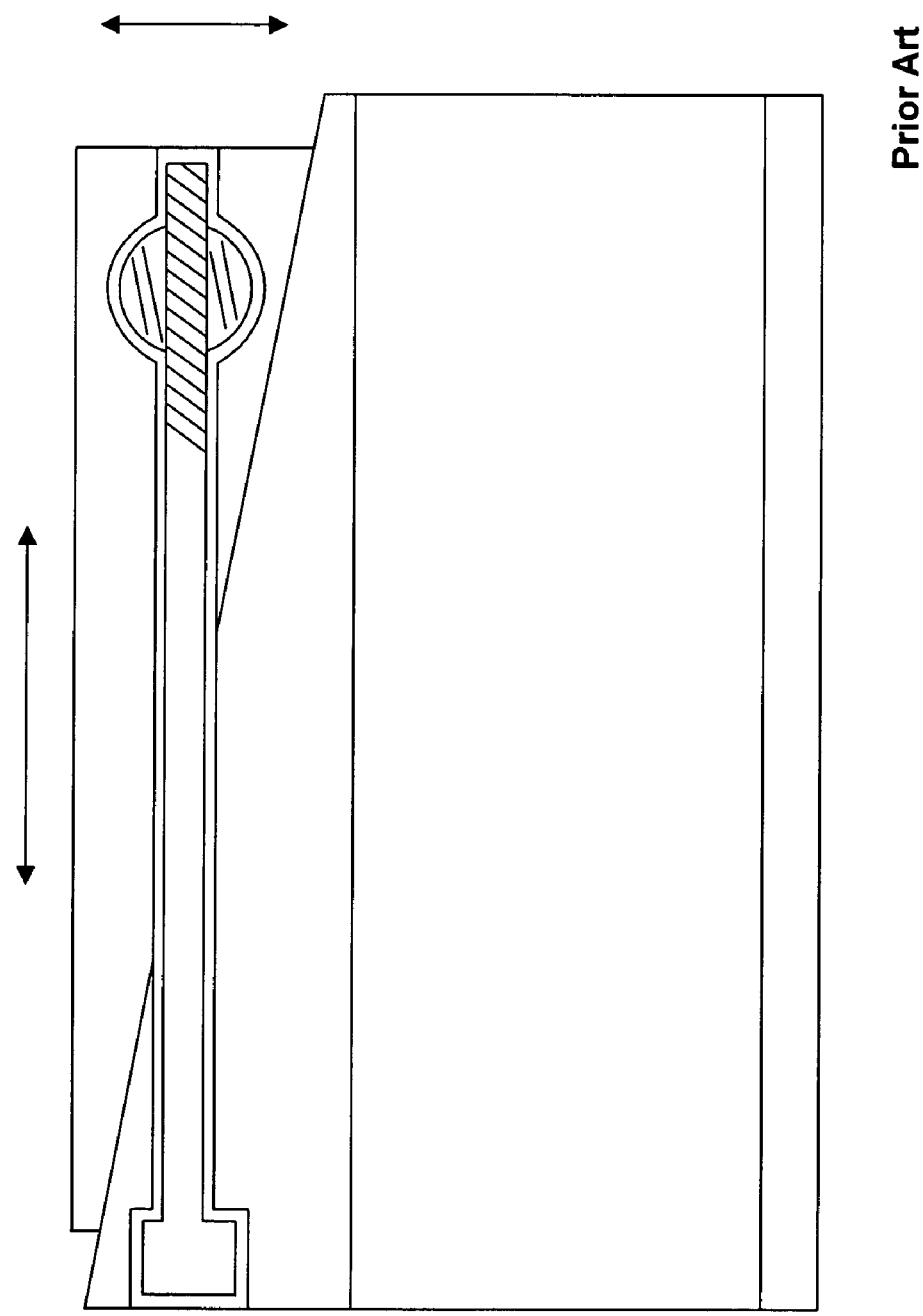
FIG. 1 is a side view of the prior art.

The bottom bracket shell (not shown) is part of the bicycle frame and comprises a housing for the components of the various embodiments shown in the drawings. The bottom bracket shell may be provided without fittings for adjusting the spindle axis apart from providing an interior surface of appropriate shape and size.

FIG. 1 is an illustration of the prior art showing a bracket assembly 10 typically comprising a body member 12 and wedge member 14. The body member 10 is provided having a generally cylindrical outer surface, the diameter of which may be altered by the adjustment of wedge member 14. A screw 16 is provided attaching wedge member 14 to body member 12. Upon rotation of screw 16, wedge member 14 is axially displaced as threads on screw 16 engage with a barrel nut 18 provided in wedge member 14. The wedge member 14 is then laterally displaced relative to a longitudinal axis of body member 12. As the bracket assembly is received inside of and in close tolerance with the bracket shell (not shown), expansion of the diameter of the bracket assembly causes the bracket assembly to engage with the interior surface of the bracket shell.

Figure 2:
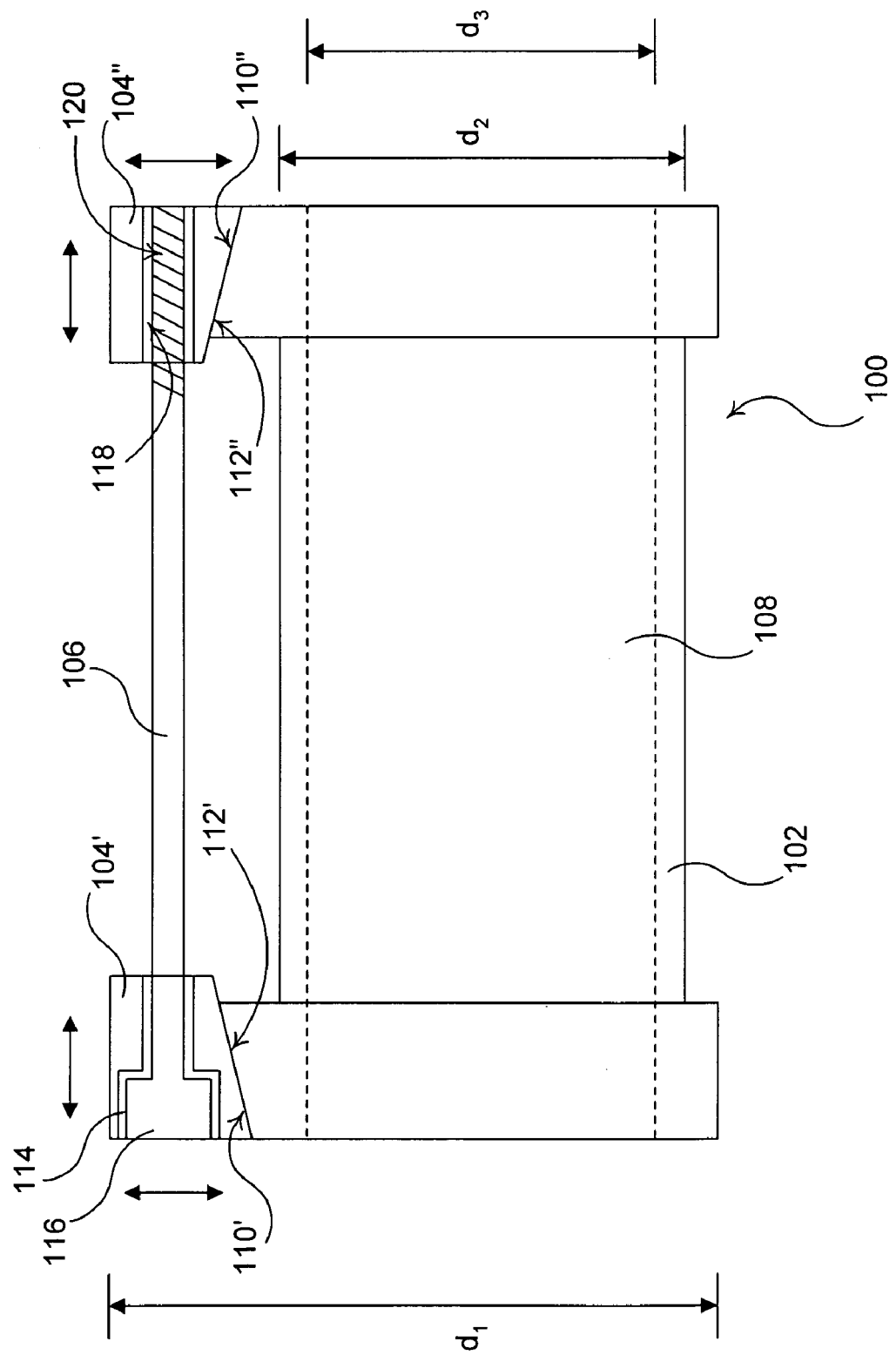
FIG. 2 is a side view of one advantageous embodiment of the invention.
Figure 3:
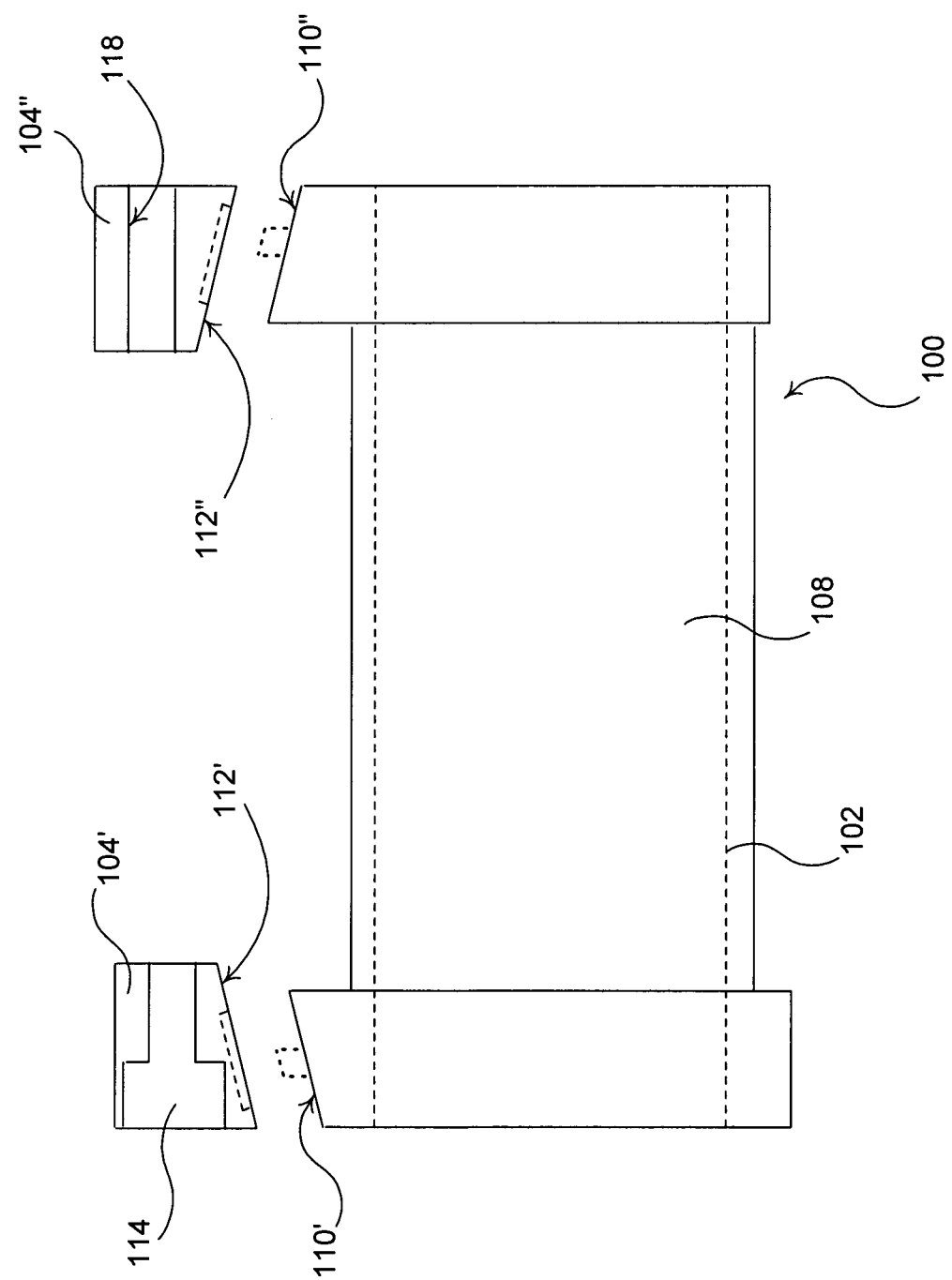
FIG. 3 is a side view of one advantageous embodiment of the invention according to FIG. 2.

FIGS. 2 and 3 illustrate one advantageous embodiment of the present invention showing bracket assembly 100. Bracket assembly 100 comprises body member 102, wedge members (104', 104"), and wedge driver 106. Bracket assembly 100 may be provided with a generally cylindrical outer surface in close fit with the bracket shell (not shown). Enough clearance is provided however, such that bracket assembly 100 may be rotated within the bracket shell. Typically a nominal clearance of 0.005 to 0.010 inch is suitable. A close fit is desirable to ensure a broad band of compressive contact between the body and shell for frictional resistance to slipping from the correctly adjusted position.

Figure 6:
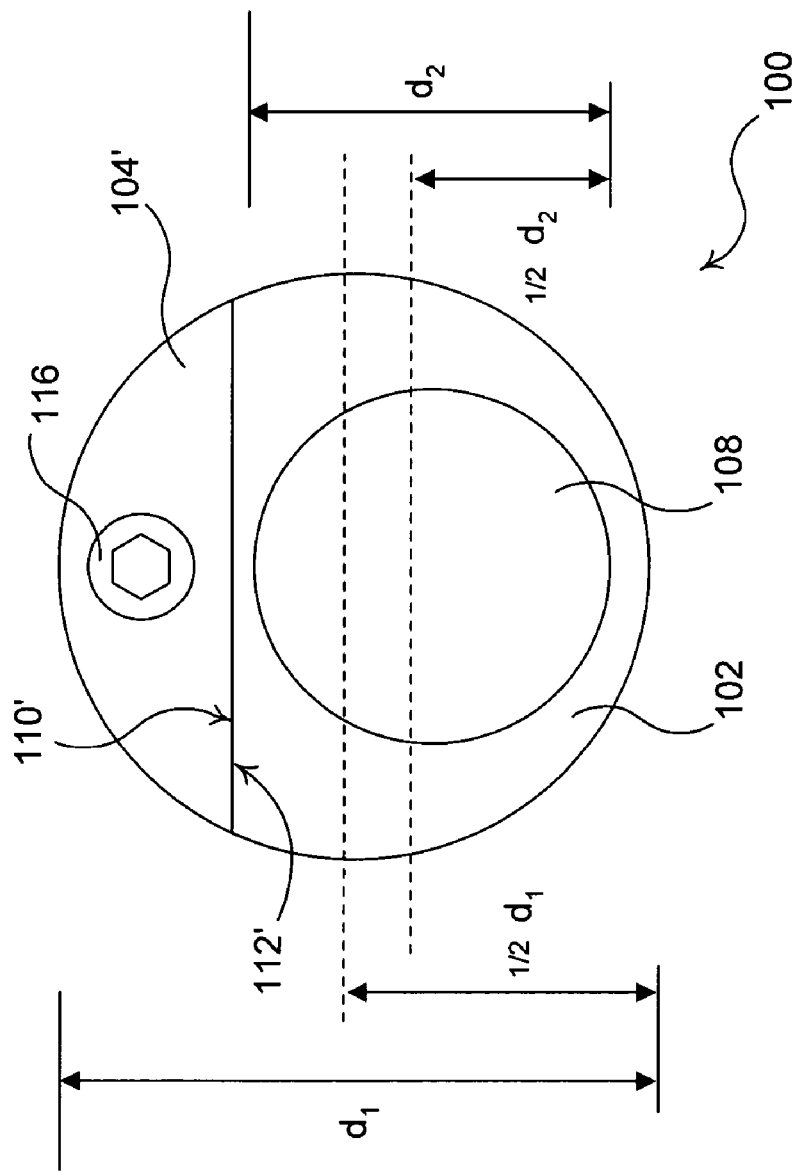
FIG. 6 is an end view of the advantageous embodiment according to FIGS. 2 and 4.

Body member 102 is further provided with a bore 108, which can better be seen with reference to FIG. 6. In this embodiment, bracket assembly 100 is provided having an outermost diameter $d_1$, an inner diameter $d_2$. Alternatively, the bore 108 is provided having a diameter $d_3$ and is offset (eccentric) by a desired amount relative to a longitudinal axis of body member 102. The desired eccentricity of the spindle, which can be about ¼ to 5/16 inch, and a minimum wall thickness in any part of the body suggest a nominal diameter of about 2⅛ inch. Bore 108 may further be provided with threading a either end to receive spindle bushings (not shown), which may be of a conventional design. The axis of the bore is parallel to the axis of the cylindrical external surface of the body, is offset (eccentric) by the desired amount Bracket assembly 102 is further provided with two body member wedge surfaces (110', 110"), which are provided as complementary to wedge surfaces (112', 112") of wedge members (104', 104") respectively. The respective wedge surfaces are provided such that upon rotation of wedge driver 106, wedge members (104', 104") will be axially displaced relative to body member 102. As wedge members (104', 104") are drawn toward each other, wedge members (104', 104") are also laterally displaced due to the sloped surface of the respective wedge surfaces thereby causing bracket assembly 100 to become engaged with the inner surface of the shell (not shown). Conversely, as the wedge members (104', 104") are moved away from each other, the wedge members (104', 104") are again laterally displaced causing bracket assembly 100 to become disengaged with the inner surface of the shell (not shown) such that bracket assembly 100 may then be rotated to adjust properly the tension in the chain (not shown).

It should be noted that, with use of two wedge surface areas rather than one elongated continuous surface, less material is required for manufacture, resulting in overall weight reduction of the bracket assembly 100. In addition, use of two wedge members (104', 104") further reduces the overall weight of the bracket assembly 100. I may also be seen from FIG. 2 that the contacting surface area of the wedge surfaces is greatly reduced when compared to that of the prior art. This provides the advantage of reducing the likelihood that wedge members (104', 104") will become stuck or frozen to body member 102 along the wedge surfaces due to the decrease surface area of the complimentary wedge surfaces.

Wedge member 104' is provided with a recess 114 therein for receiving a head 116 of wedge driver 106 which is counter sunk therein, while wedge member 104" is provided with a threading 118 to engage with threads 120 provided on wedge driver 106. It is contemplated that while a screw is illustrated as wedge driver 106 in this embodiment, any appropriate device for causing axial displacement of wedge members (104', 104"). It is further contemplated that bracket assembly 100 may comprise any relatively light-weight alloy or composite having sufficient structural strength to maintain bracket assembly in an engaged position relative to the shell (not shown).

Optionally, protrusions (122', 122") may be provided on body member wedge surfaces (110', 110") to engage with channels (124', 124") provided in wedge surfaces (112', 112") as illustrated in FIG. 3. In this manner, protrusions (122', 122") may optionally engage with channels (124', 124") such that wedge members (104', 104") are maintained in proper alignment with body member 102.

Figure 4:
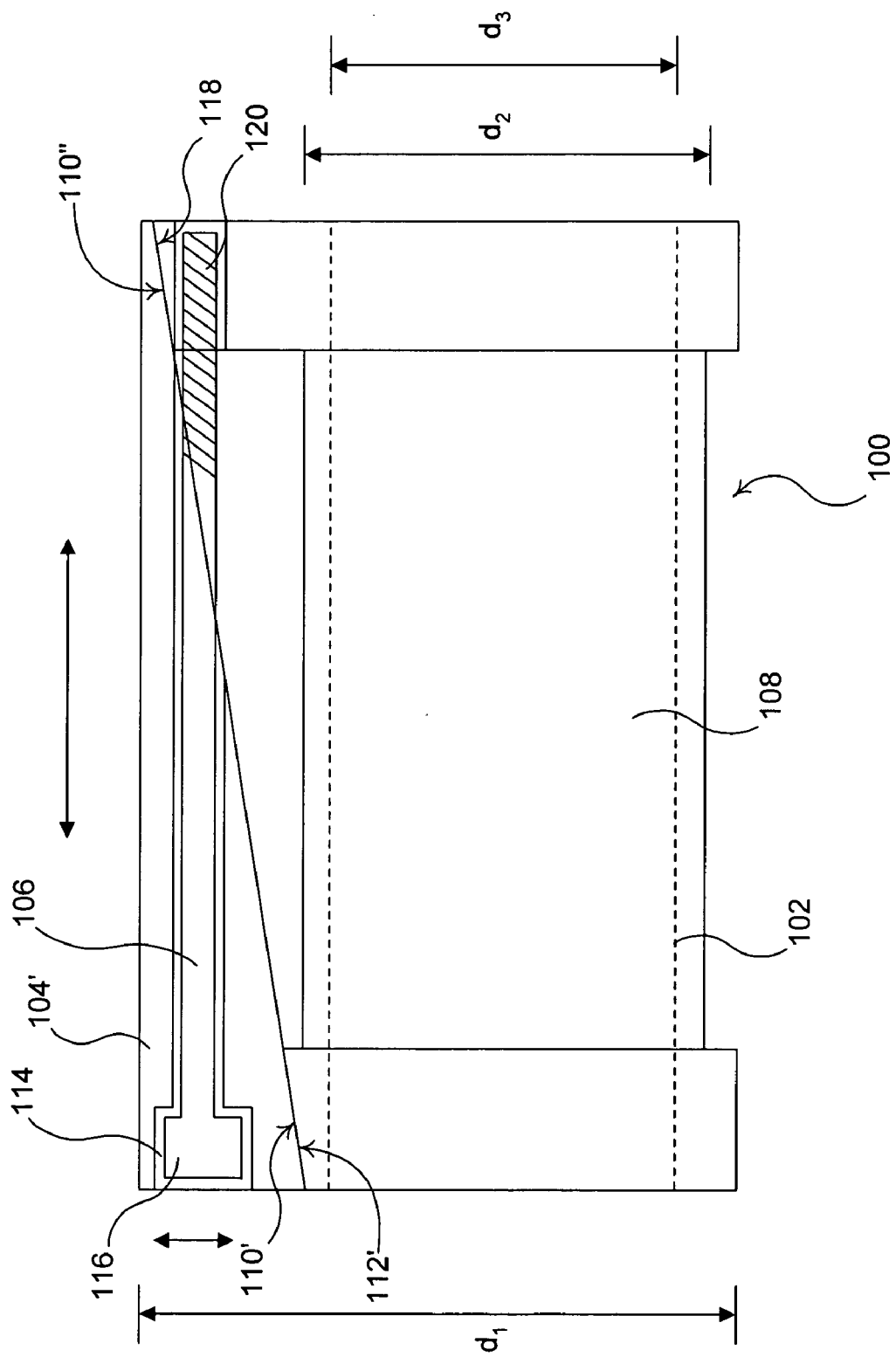
FIG. 4 is a side view of another advantageous embodiment of the invention.
Figure 5:
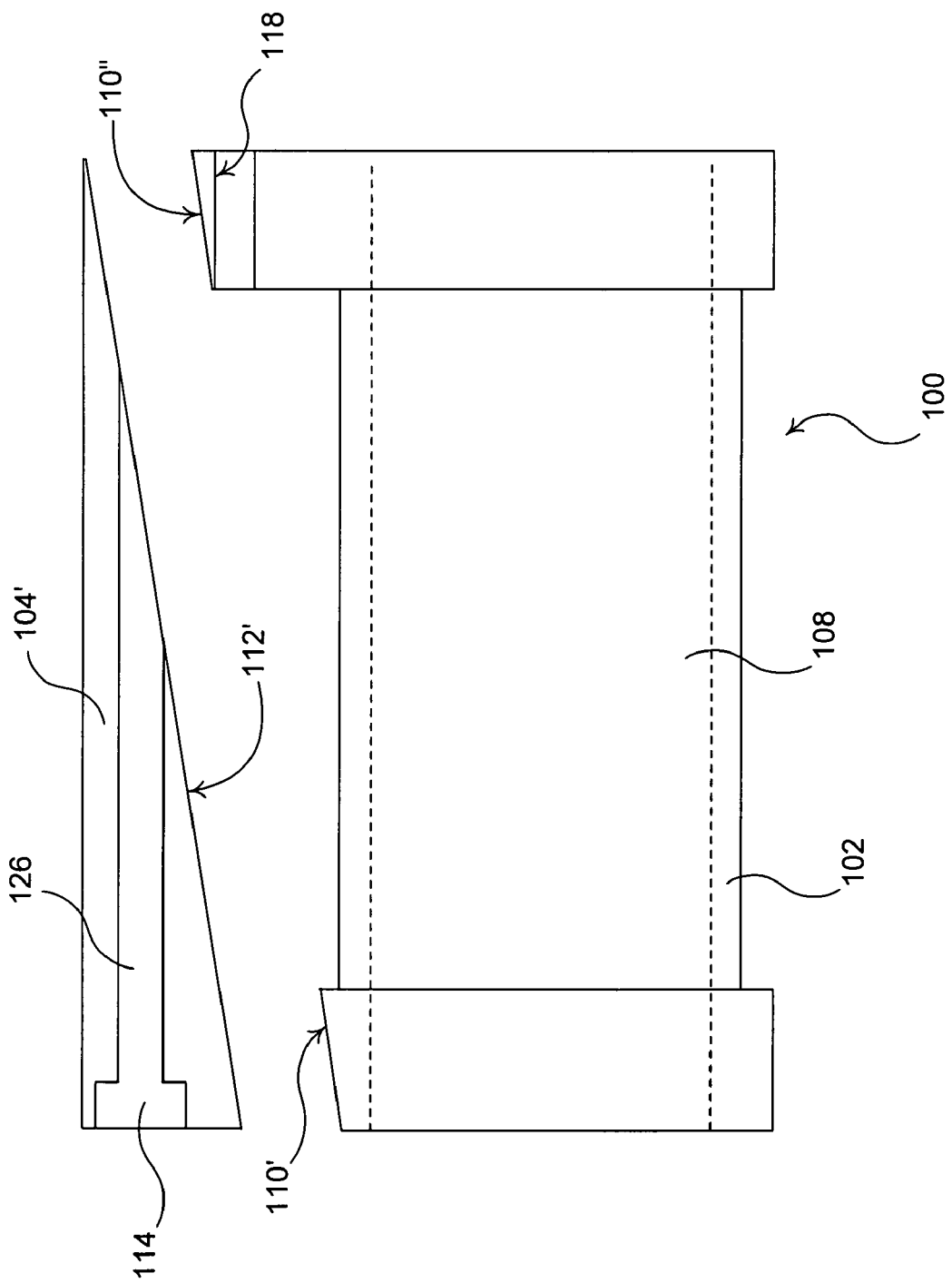
FIG. 5 is a side view of one advantageous embodiment of the invention according to FIG. 4.

Referring now to FIGS. 4 and 5, an alternative embodiment of the present invention is illustrated including body member 102, a single wedge member 104' and a wedge driver 106. This embodiment is similar to that previously illustrated in FIGS. 2 and 3, except a single wedge member 104 is provided, and body member wedge surfaces (110', 110") are provided lying in the same plane.

Wedge driver 106 also engages directly with body member 102 at one end thereof such that wedge member 104' may be axially displaced relative to body member 102 in a similar manner as previously discussed in connection with FIGS. 2 and 3 and therefore will not be reiterated here. While only one wedge member 104' is provided in this embodiment, it should be noted that two body member wedge surfaces (110', 110") are still provided thereby gaining the advantages as previously discussed in connection with FIGS. 2 and 3.

Figure 7:
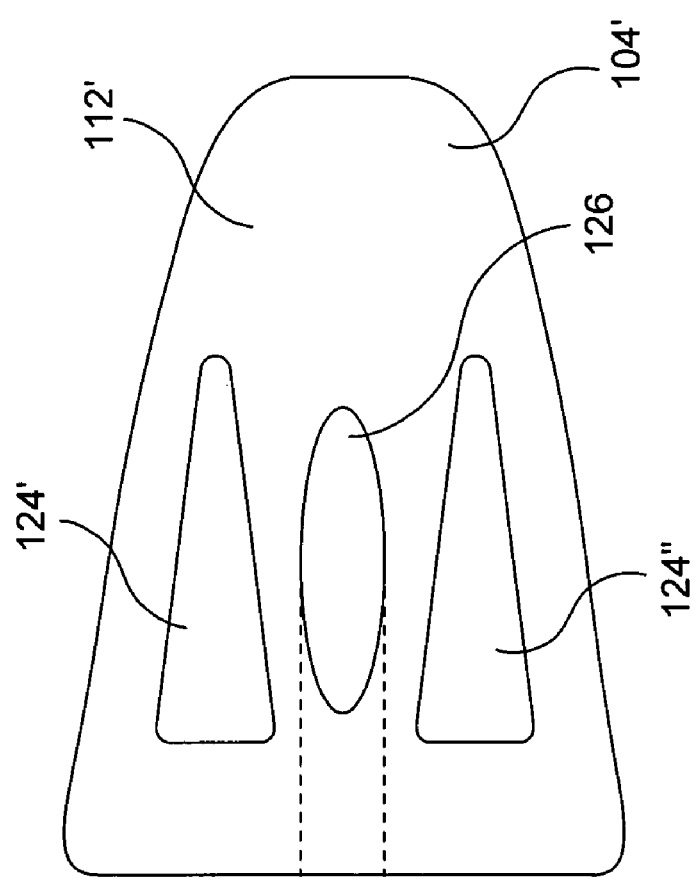
FIG. 7 is a bottom view of the wedge illustrating the wedge surface according to FIG. 4.

Referring now to FIG. 7, wedge member 104' as utilized in connection with FIGS. 4 and 5 is illustrated. Provided in wedge surface 112' are indentations (124', 124"), which reduce the volume of wedge member 104' thereby reducing the overall weight of bracket assembly 100. Also illustrated in wedge surface is passage 126, which is a passage for driving element 106 to extend therethrough.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A bracket assembly for a pedal shaft of a bicycle frame comprising:
   a body member having a longitudinal axis, to be positioned within the bicycle frame for receiving the petal shaft, said body member having:
      at least two body member wedge surfaces that are sloped with respect to the longitudinal axis of said body member;
      a bore having an axis eccentric to the longitudinal axis of said body member;
   at least one wedge member having a wedge surface co-planar with at least one of the at least two wedge surfaces of said body member; and
   a wedge driver for axially displacing said at least one wedge member relative to said body member;
      wherein when said at least one wedge member is displaced axially, said at least one wedge member is laterally displaced relative to said body member such that said bracket assembly is engageable with an internal surface of the bicycle frame.

2. The assembly according to claim 1 wherein said wedge driver comprises a screw.

3. The assembly according to claim 2 wherein said at least one wedge member includes threading engageable with the screw.

4. The assembly according to claim 3 wherein an opening is provided in an end portion of said at least one wedge member such that the screw may extend through said at least one wedge member and out the opening in the end portion when selectively adjusted.

5. The assembly according to claim 1 wherein said bore comprises an outer surface having a diameter that is different than the diameter of the external outer surface of said body member.

6. The assembly according to claim 5 wherein the diameter of the outer surface of said bore is smaller than the diameter of the external outer surface of said body member.

7. The assembly according to claim 1 further comprising at least two wedge members, each wedge member having an external surface received against the internal surface of the tube and a wedge surface co-planer with said at least two wedge surfaces respectively.

8. The assembly according to claim 7 wherein said driving element comprises a screw.

9. The assembly according to claim 8 wherein the screw extends between said at least two wedge members, one of said at least two wedge members comprising threading for engaging with threading on the screw and a head portion of the screw engaging with the other of said at least two wedge members.

10. The assembly according to claim 7 wherein said bore comprises an outer surface having a diameter that is different than the diameter of the external outer surface of said body member.

11. The assembly according to claim 10 wherein the diameter of the outer surface of said bore is smaller than the diameter of the external outer surface of said body member.

12. The assembly according to claim 7 wherein said at least two planar wedge external surfaces are not co-planar.

13. A bracket assembly for mounting a shaft within a machine comprising:
- a body member having a longitudinal axis, to be positioned within the machine for receiving the shaft, said body member having:
  - at least two body member wedge surfaces that are sloped with respect to the longitudinal axis of said body member;
  - a bore having an axis eccentric to the longitudinal axis of said body member;
- at least one wedge member having a wedge surface co-planar with at least one of the at least two wedge surfaces of said body member; and
- a wedge driver for axially displacing said at least one wedge member relative to said body member;
- wherein when said at least one wedge member is displaced axially, said at least one wedge member is laterally displaced relative to said body member such that said bracket assembly is engageable with an internal surface of the machine.

14. A bracket assembly comprising:
a body member to be positioned within an opening, said body member having:
  - a bore having a longitudinal axis eccentric to a longitudinal axis of said body member;
  - a first outer surface having a first diameter $d_1$;
  - a second outer surface having a second diameter $d_2$, wherein $d_1$ is larger than $d_2$;
  - a body member wedge surface that is sloped with respect to the longitudinal axis of said body member;
at least one wedge member having a wedge surface co-planar with said body member wedge surface;
a wedge driver for moving said at least one wedge member relative to said body member;
  wherein when said at least one wedge member is displaced axially, said at least one wedge member is laterally displaced relative to said body member such that bracket assembly is engageable with an internal surface of the opening.

15. The assembly according to claim 14 wherein said wedge driver comprises a screw.

16. The assembly according to claim 15 wherein said at least one wedge member includes threading engageable with the screw.

17. The assembly according to claim 14 wherein said wedge surface comprises at least two wedge surfaces.

18. The assembly according to claim 17 further comprising at least two wedge members, each wedge member having an external surface received against the internal surface of the tube and a wedge surface co-planer with said at least two wedge surfaces respectively.

19. The assembly according to claim 18 wherein said driving element comprises a screw.

20. The assembly according to claim 19 wherein the screw extends between said at least two wedge members.

21. The assembly according to claim 1 wherein said at least two planar wedge external surfaces are co-planar.

22. The assembly according to claim 1 wherein the wedge surface of said at least one wedge member comprises a channel.

* * * * *